United States Patent [19]

Bandoo et al.

[11] 3,803,559

[45] Apr. 9, 1974

[54] MEMORY PROTECTION SYSTEM

[75] Inventors: Tadaaki Bandoo; Masaaki Murakami; Koji Hirai, all of Hitachi; Shigeyoshi Tsutsui, Kokubunji, all of Japan

[73] Assignee: Hitachi, Ltd., Tokyo, Japan

[22] Filed: July 26, 1972

[21] Appl. No.: 275,164

[30] Foreign Application Priority Data

July 26, 1971 Japan ................................ 46-55196

[52] U.S. Cl. ............................................ 340/172.5

[51] Int. Cl. ............................................ G11c 7/00

[58] Field of Search ................................. 340/172.5

[56] References Cited

UNITED STATES PATENTS

| | | | |
|---|---|---|---|
| 3,573,855 | 4/1971 | Cragon et al. | 340/172.5 |
| 3,340,539 | 9/1967 | Sims, Jr. | 340/172.5 |
| 3,271,744 | 9/1966 | Petersen et al. | 340/172.5 |

*Primary Examiner*—Gareth D. Shaw

*Attorney, Agent, or Firm*—Craig and Antonelli

[57] ABSTRACT

In an on-line computer system wherein a core memory area comprises a supervisory program area, a data area common to tasks, a subroutine area, task areas for application programs from users and so on, there are four registers for storing upper and lower boundaries, for both the application task area and the common data area, in order that the two areas between the upper and lower boundaries may be made "no-protection" area.

4 Claims, 5 Drawing Figures

MEMORY PROTECTION SYSTEM

BACKGROUND OF THE INVENTION

This invention relates to a memory protection system and more particularly to a protection system for ensuring that a program in task areas for application programs cannot interfere with others in a main memory.

DESCRIPTION OF THE PRIOR ART

The main storage of a conventional modern computer consists of a supervisory program area, the many application program areas, a data area which is commonly used by the application programs and additionally used for communicating information among the application programs, and a subroutine area which is used in common by the application programs.

Among these, the supervisory program and the subroutine program are standard programs supplied by a computer manufacturer, and may be generally regarded as containing no errors. Since the application programs however, are not completely debugged, they may have errors which could cause them to destroy the other normal programs beyond the areas of intended operation. Furthermore, in the case where a certain program is to occupy, exclusively, and use a specified data area for a fixed period of time or to prevent any other program from using the specified data, in order to maintain the secrecy of the information, it is necessary to build "fences" around each program.

Memory protection systems operate in different ways on different computers, as follows.

One scheme used in a small-sized computer has two registers which memorize an upper-limit and a lower-limit of a protected area, respectively. These limits are loaded in the registers when a control processing unit is assigned from the supervisory program to the application program.

In the conventional protection system, the supervisory program area is protected from the operations of the application programs in this way, thus preventing the supervisory program area from being destroyed by errors in the application programs. The protection hardware of the system is such that, when the application program executes a write-in instruction, the effective address is compared with the upper and lower limits in the registers and then, when the effective address lies within the protected area, i.e., where it is intended to effect write-in within the protected area, a product-error signal is generated.

This system, however, has been disadvantageous in that, where a certain application program destroys another application program area, no protect-error signal is provided. That is to say, areas are often destroyed among the application programs in this system, requiring a large amount of time to find the mistake in the program for debugging purposes.

Another scheme which has been used in a medium-sized computer employs a single protect-bit which is provided for each word unit of memory. When the bit is a "1," protection is applied to prevent write-in.

Although this system may freely set the number, range, etc. of protection areas, it has serious disadvantages as mentioned below.

One disadvantage is that the size of the memory increases by one bit for each word. A more serious disadvantage is that, since rewritting of the protect-bits is time-consuming, the system is hardly employable in the case where it is desired to dynamically change the protected areas.

SUMMARY OF THE INVENTION

The present invention has been developed in view of the above various points, and has for one of its objects the provision of a novel memory protection system which, with simple and convenient hardware construction, prevents important program areas from being rewritten and facilitates debugging of a program. Further objects of the present invention will become apparent from the following detailed description.

To accomplish these objects, the present invention has a plurality of pairs of registers which store boundary addresses within which the areas are protect-released. When the application program is executed, only a data area common to the application programs and the application program area under execution are protect-released. When a program under execution moves to a supervisory area (hereinafter called a monitor area) or resident subroutine area, all the memory areas are protect-released or only the monitor area and the resident subroutine area are protect-released. Since only the areas which are needed by the program under execution are protect-released, the protecting function is provided with a simple construction. Additionally, it has the advantage for protect-releasing the two areas at the same time which are used by the application program, one area being released from the protection concerning the reading, writing and executing functions and another area being released from the protection concerning only the reading and writing function. In this way, execution of a wrong program between the two released areas is prevented. Namely, the program to be used by an on-line system uses two kinds of areas. In one area, the program causes write-in, read-out or execution, and in the other area it causes only read-out and write-in for communicating with each other. It has the advantage of providing a protection function using this difference between these two areas.

DETAILED DESCRIPTION OF THE PREFERRED EMBODIMENTS

Figures 1, 2:
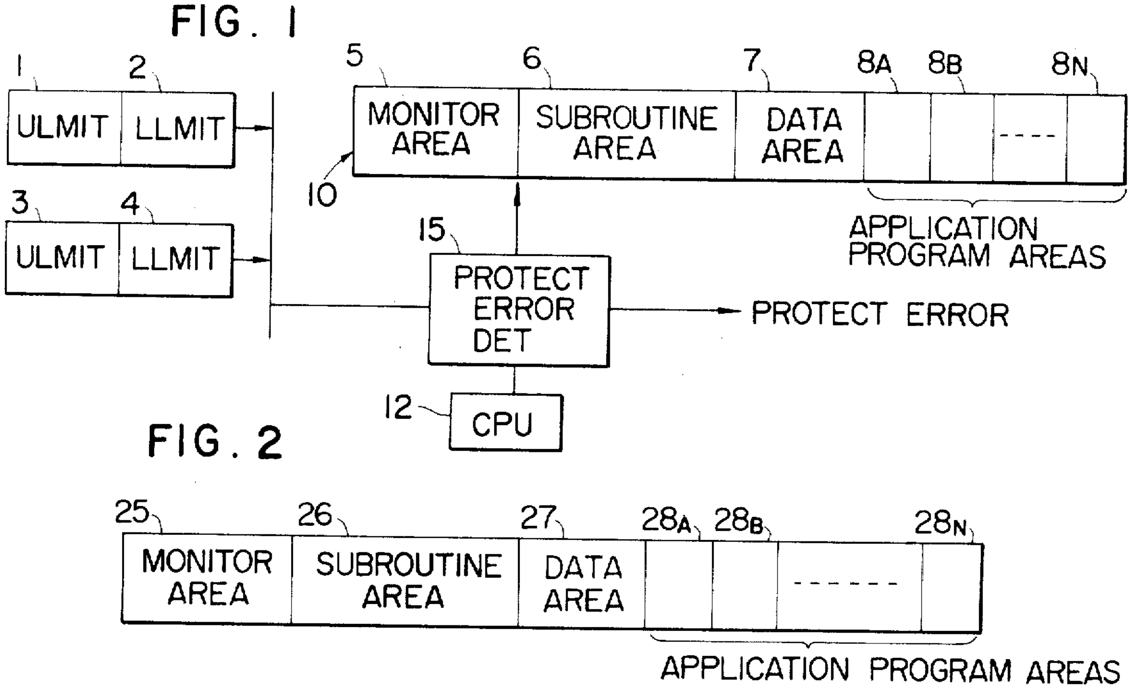
FIG. 1 is a diagram showing an embodiment of a memory protection system according to the present invention.
FIG. 2 is a diagram showing an example of a memory map of an on-line system according to the present invention.

FIG. 1 illustrates an embodiment of the memory protection system according to the present invention. A main storage 10 has a monitor area 5 which contains a supervisory program, a subroutine area 6, a data area 7 used in common by application programs and application program areas 8A–8N which contain the application programs.

Two sets of registers (ULMIT 1, LLMIT 2), (ULMIT 3 and LLMIT 4) represent upper and lower boundaries of two protect-release areas. An effective address, delivered from a central processor unit 12 to protect error detector 15 is compared with the upper and lower boundaries from the registers. When the address is located outside the areas appointed by the two sets of registers, a protect error signal is generated.

FIG. 2 refers to the case where a program under execution lies in the application program area 28B. In this case, the boundaries of the application program area 28B are defined with the registers 1 and 2, and the boundaries of a data area in common to all of the application programs are also defined with the registers 3 and 4 in the FIG. 1.

If the execution of a program moves to one in the monitor area 25, all the memory areas are made the protect-release area, or protection of the read-out, write-in and execution concerning the monitor area and protection of the read-out and write-in concerning the application program areas is released. Assuming that the monitor (supervisory) program has no program error because this monitor program is supplied by a computer manufacturer, then protection concerning the all areas is released. However, if the monitor program contains errors, protection concerning the application program areas is needed. In this case, when it is necessary that information such as data or a program is written in the application program areas by executing the monitor program, protection against read-out and write-in of the application program area is released, but protection against the execution for the application program is needed, in order to prevent a wrong movement from the monitor program to the application program.

When the program to be executed is a subroutine area, read-out, write-in and execution protection concerning the subroutine aera is released and only read-out and write-in protection concerning the application program area or common data area is released. All protection concerning the application program areas is released in order to simplify the system on the assumption that the subroutine program has no error.

When the address to be used by execution of the program lies only within the two areas designated by the upper and lower limit registers, no problem arises. In contrast, when a common subroutine is used or when a macro-instruction concerned with the monitor program is used, special measures are required in order to provide a jump into the protected area. To provide a jump into the protected area, there are employed, for example, the following methods:

A. A release of the protection before jump-in, and

B. Providing a special jump instruction separately from the general jump instructions and releasing the protection when the special instruction is executed.

Figure 3:
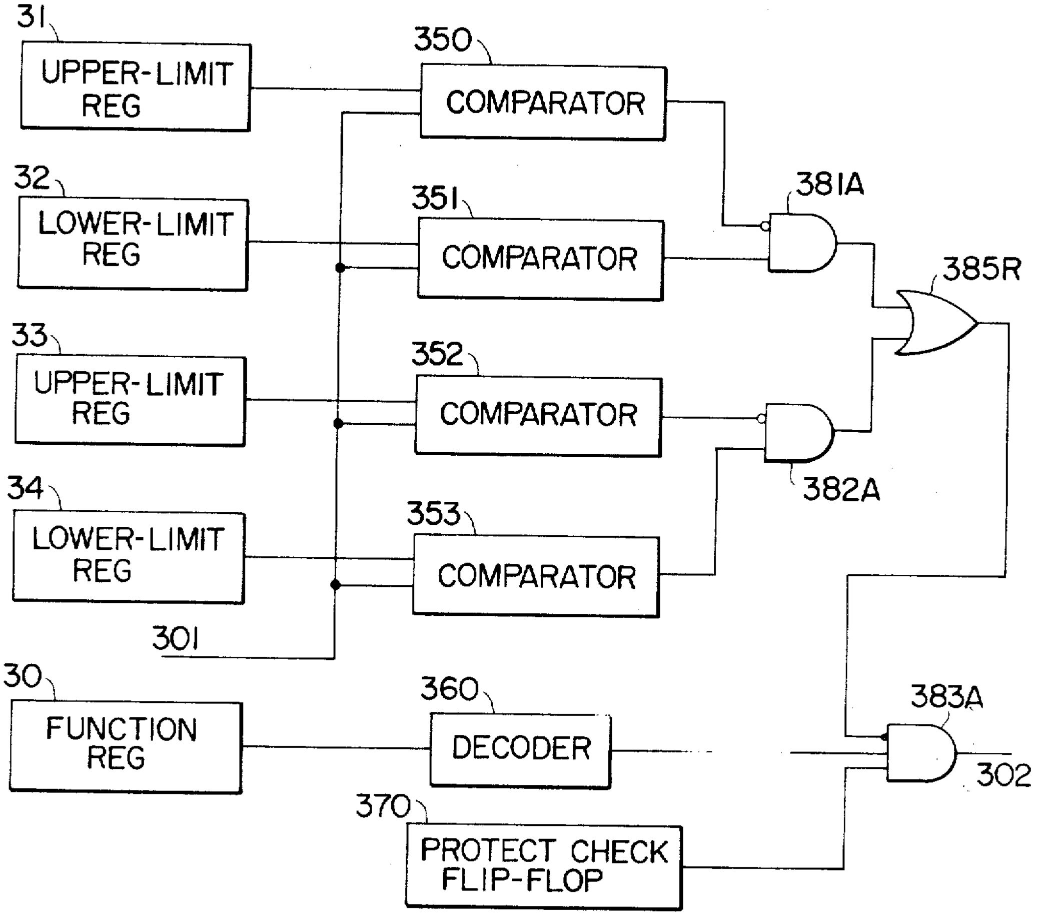
FIG. 3 is a diagram showing an embodiment of hardware construction according to the present invention.

FIG. 3 shows an embodiment of the hardware construction constituting the present invention. Upper and lower limit registers 31, 32, 33 and 34 store the first and the last addresses of areas to be released from the protection and are provided in two sets.

A line 301 transmits to the comparators 350, 351, 352 and 353, addresses to be finally determined, after the addition of a variety of modifications, when a memory area is referred to.

An instruction to be executed which is loaded into a function register 30 is decoded in a decoder 360 and whether or not a protect-check is made is determined in accordance with the instruction. When it is necessary to execute the protect-check, the decoder 360 transmits an output "1" to an AND gate 383A.

When a protect-check is carried out, a protect-check flip-flop 370 is set at "1," while it is reset at "0" when a check is not carried out.

The respective comparators 350, 351, 352 and 353 subtract the effective address of the line 301 from the address of the upper and lower limit registers 31, 32, 33 and 34 and provide outputs "1" when the results are positive and outputs "0" when negative. The output of an OR gate 385R is $$(U\alpha - \gamma). L\alpha - \gamma) + (U\beta - \gamma). (L\beta - \gamma),$$

where:

$U\alpha$ is the address value loaded in Register 31,
$L\alpha$ is the address value loaded in Register 32,
$U\beta$ is the address value loaded in Register 33,
$L\beta$ is the address value loaded in Register 34, and
$\gamma$ is the address value from the line 301.

This provides a check as to whether or not the effective address falls within a range specified by the two sets of upper and lower limit registers and, then, when the OR gate 385R has an output "1," it means that the effective address lies within the protect-release areas, while when it has an output "0," the address is outside the protect release areas.

The AND gate 383A is constructed such that the output of the OR gate 385R is applied to an inhibit terminal thereof, while the outputs of the decoder 360 and the flip-flop 370 are respectively applied to the other two input terminals of AND gate 383A. When the protect-check flip-flop has an output "1" and the decoder has an output "1" and the execution address from the line 301 is beyond the protect-release area, a protect-error signal is read out through line 302 from the AND gate 383A.

Furthermore, in the case where the execution area transfers to the monitor area or the subroutine area, an instruction to reset the protect-check flip-flop 370 is introduced before the jump, or the protect-check flip-flop 370 is reset by means of a special jump instruction.

Thus, a protection error is prevented from being read-out from the AND gate 383A for all effective addresses from the line 301. That is, the flip-flop 370 for the protect-check is reset to "0," whereby all of the memory areas are made the protect-release area.

Assuming that the monitor area and the subroutine area have programs which have been sufficiently tested to be free from errors, and that there is no possibility of any other program being destroyed by the programs, all the memory areas become the protect-release area at this time only, so that the monitor and the subroutine may utilize all the areas without any inconvenience.

The foregoing system may be particularly adopted when the monitor or the subroutine is perfectly free from errors. However, when the monitor is a large scale monitor, a large amount of time is required for completely eliminating errors. For this reason, the protection system is also utilized in the monitor or the subroutine for the purpose of error detection, in such a way that when the executed program is located at the monitor area and the subroutine area, only the monitor region or subroutine region is protect released. Thus, the condition that the monitor is going to destroy an application program area will be detected. In the monitor program (supervisory program), however, read-out write-in against the application program areas should be executed in case of input, output etc. Hence, it is necessary, at this time, to release only the necessary part from protection.

The function register 30 serves to distinguish whether or not the particular instruction necessitates protection. For example, in the case where the instruction in one of a mere addition, which does not destroy stored contents, the output of the decoder 360 does not always result for any effective addresses.

Figure 4:
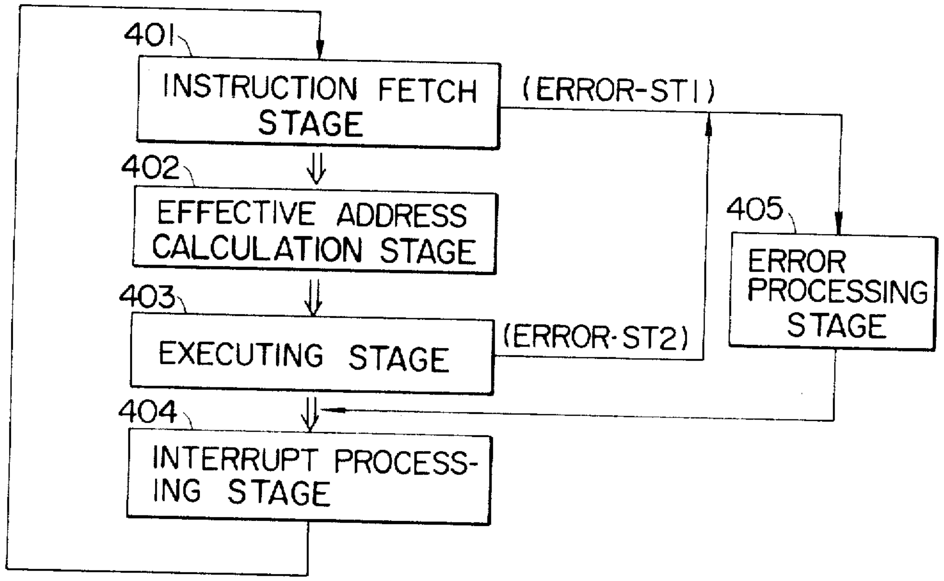
FIG. 4 is a flow chart for executing an instruction of a program stored in a main memory.

FIG. 4 shows a flow chart for executing the instructions. At an instruction fetch stage 401, an instruction to be executed is read out according to a value of a program counter. At the next stage, an effective address calculation stage 402, the effective address which indicates the operand address is calculated. At an executing stage 403, the instruction is executed. The effective address is used in the stage. At an interrupt processing stage 404, an interrupt is detected. If there is an interrupt, an address of the next executing instruction will jump to an interrupt handling routine in the monitor program.

When the instruction is fetched, there may occur an error depicted as ERROR-$ST_1$ which results from an access of an address beyond a boundary. At the executing stage 403, there may occur an error depicted as ERROR-$ST_2$, when the instruction reads or writes in a wrong address beyond a boundary. When these errors occur, an error processing state 405 stops the executing routine, memorizes this condition and then causes an interrupt for informing the operator of the condition.

Figure 5:
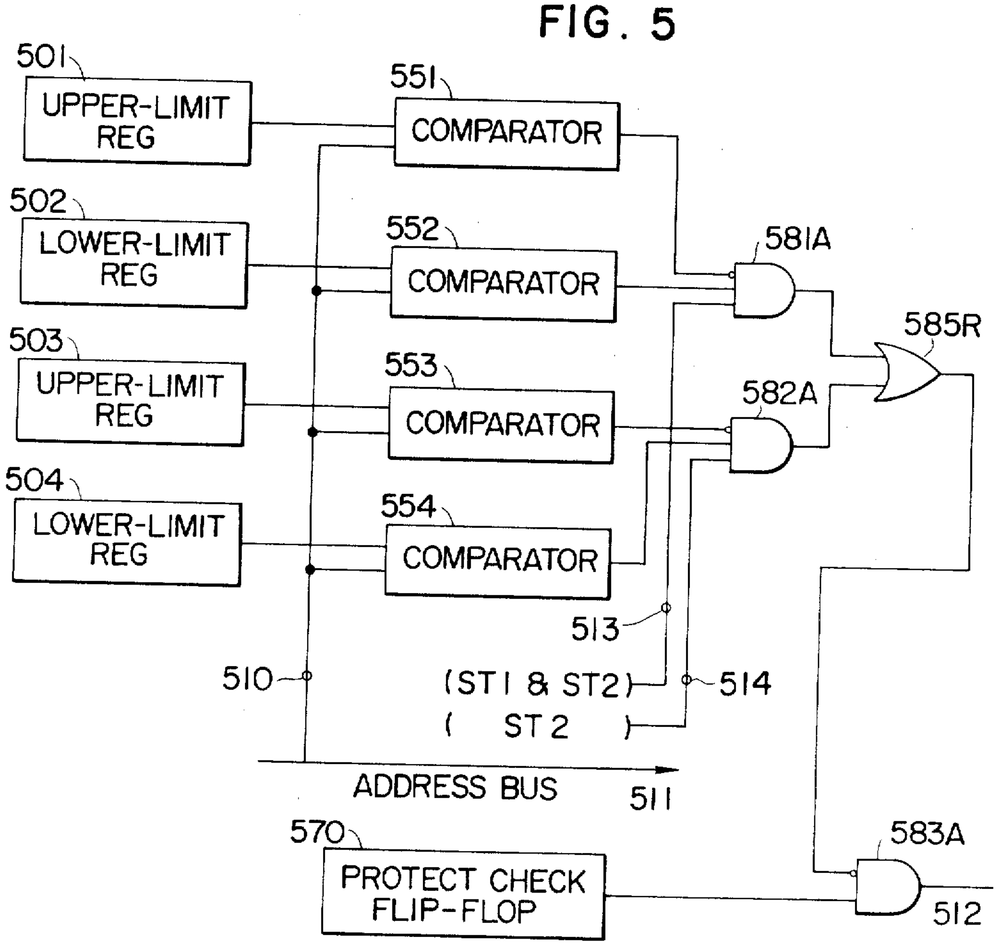
FIG. 5 is a diagram showing another embodiment of hardware construction according to the present invention.

FIG. 5 shows hardware for preventing an erroneous operation based upon these errors. An upper limit register 501 and a lower-limit register 502 define an area for a program to be executed, and an upper-limit register 503 and a lower limit register 504 define another area to be used or needed by the executing program. When a processing unit selects an address for write-in, read out or execution, the address number is applied from the address bus 511 and comparators 551–554, which subtract the effective address number from the upper and lower limit registers, provide outputs "1" when the results are positive and outputs "0" when negative.

At the instruction fetch stage 401, a pulse ST1 is delivered to an AND gate 581A through a line 513 and at the executing stage 403, a pulse ST2 is delivered to AND gates 581A and 582A through the lines 513 and 514.

The outputs of the AND gates 581A and 582A are applied to the inhibit terminal of an AND gate 583A and another terminal thereof is connected to a protect-check flip-flop.

When the program to be executed is the monitor program, the registers 501 and 502 define the monitor program area and the other area is defined by the resistors 503 and 504. Since the pulse ST1 permits execution, it is permitted to execute only the monitor program area. Since the pulse ST2 also permits read-out and write-in, it is permitted to read-out and write-in for approximately all of the area. Then, if an instruction written in an area, except the monitor area, is executed, the output of the OR gate 585R is changed to "0" by the output "0" from the AND gate 582A, and then a protect-error signal is delivered from a line 512.

When a program to be executed is the application program, the registers 501 and 502 store the boundaries of the application program area and the registers 503 and 504 store the boundaries of the subroutine area. In this system, execution of the subroutine program can be prevented when the application program must be executed.

Similarly, in the case where a program to be executed is a subroutine program, the registers 501 and 502 store the subroutine area boundaries and the registers 503 and 504 store the boundaries of application programs.

As explained above, according to the present invention, it is necessary to prevent an application area from destroying other application areas, and it becomes very simple to detect mistakes of a program through debugging.

The present invention specifies a protect-release area by means of two sets of registers for setting upper and lower falls and logically judges whether or not an effective address fails within the protect-release area. Therefore, the hardware for memory protection is extraordinarily simplified, and the invention is particularly suited for the memory protection system of small and medium sized controlling computers.

Additionally, if one set of the registers is for the execution program area and another is for the area to be used or needed by the program, a protection function of the first set covers write-in, read-out and execution and the second set covers only write-in and read-out. Therefore, erroneous operation based on a wrong program is completely prevented.

We claim:

1. In a memory protection system of an on-line computer system including a main storage, which main storage comprises:
a monitor area which stores a monitor program;
a plurality of application program areas, each of which stores an application program the execution of which is controlled by the monitor program;
a subroutine area which stores a subroutine program being used commonly by the application programs; and
a common data area which is used commonly by the application programs;
the improvement comprising:
a first register means for storing an upper boundary of a first area to be released from write-in, read-out and execution protection;
a second register means for storing a lower boundary of said first area;
a third register means for storing an upper boundary of a second area to be released from write-in, read-out and execution protection;
a fourth register for storing a lower boundary of said second area;
first transmitting means for transmitting an address to be written, read, or executed to four comparators, said comparators being made up of
a first comparator for comparing said address with the boundary in said first register,
a second comparator for comparing said address with the boundary in said second register,
a third comparator for comparing said address with the boundary in said third register, and a fourth comparator for comparing said address with the boundary in said fourth register;

a first gate means for generating a signal which indicates whether or not said address falls within said first and second areas to be released from write-in, read-out and execution protection, in response to the outputs of said comparators;

a second transmitting means for transmitting a signal when said memory protection system is operating; and second gate means for generating a signal to indicate that a protection error has occurred when said second gate means receives a signal from said second transmitting means and a signal from said first gate means indicating that said address lies outside said protect released areas.

2. A memory protection system as defined in claim 1, characterized in that where the executing program is one of said application programs, said first area to be protect-released is said application program area and said second area is said data area;

where the execution is said monitor program, said first area to be protect-released is said monitor area and said second area is all of the other areas; and where the execution is said subroutine program, said first area to be protect-released is said subroutine area and said second area is the application program area corresponding to said executing program.

3. In a memory protection system of an on-line computer system including a main storage, which main storage comprises:

a monitor area which stores a monitor program;

a plurality of application program areas, each of which stores an application program the execution of which is controlled by the monitor program;

a subroutine area which stores a subroutine program being used commonly by the application programs; and a common data area which is used commonly by the application program;

the improvement comprising:

a first register means for storing an upper boundary of a first area to be released from write-in, read-out and execution protection;

a second register means for storing a lower boundary of said first area;

a third register means for storing an upper boundary of a second area to be released from write-in and read-out;

a fourth register for storing a lower boundary of said second area;

first transmitting means for transmitting an address to be written, read or executed;

second transmitting means for transmitting a signal indicating that execution is permitted;

third transmitting means for transmitting a signal indicating that both write-in and read-out are permitted;

first means for comparing said address from said first transmitting means with the boundaries of said first and second registers and for generating a signal which indicates whether or not said address falls within said first area in response to said signal from said second or third transmitting means;

second means for comparing said address from said first transmitting means with the boundaries of said third and fourth registers and for generating a signal which indicates whether or not said address falls within said second area in response to the signal from said third transmitting means; and first gate means for generating a signal to indicate that a protection error has occurred, in response to both signals from said first and second comparing means.

4. A memory protection system as defined in claim 3, characterized in that when the executing program is one of said application programs, said first area to be protect-released is said application program area and said second area is said data area;

where the execution is said monitor program, said first area to be protect-released is said monitor area and said second area is all of the other areas; and where the execution is said subroutine program, said first area to be protect-released is said subroutine area and said second area is the application program area corresponding to said executing program.

* * * * *